United States Patent

Wyatt

[15] 3,681,986
[45] Aug. 8, 1972

[54] FLUID FLOW METERS

[72] Inventor: Derek Gerald Wyatt, Oxford, England

[73] Assignee: National Research Development Corporation, London, England

[22] Filed: April 30, 1971

[21] Appl. No.: 139,272

Related U.S. Application Data

[63] Continuation of Ser. No. 822,204, May 6, 1969.

[52] U.S. Cl..........................73/194 EM, 128/2.05 F
[51] Int. Cl................................................G01p 5/08
[58] Field of Search...............73/194 EM; 128/2.05 F

[56] References Cited

UNITED STATES PATENTS 3,605,726  9/1971  Williams et al........73/194 EM

FOREIGN PATENTS OR APPLICATIONS 1,095,915  12/1967  Great Britain........73/194 EM

*Primary Examiner*—Charles A. Ruehl
*Attorney*—Cushman, Darby and Cushman

[57] ABSTRACT

A flow meter for measuring the flow rate of an electrically conductive fluid, particularly blood, which comprises a tube, an electromagnet consisting of a ferromagnetic core material in the form of a thin-walled collar encircling or substantially encircling the tube and windings on the core, the windings being wound transversely around the core in a uniform manner but being oppositely directed on diametrically opposed halves of the core, and a plurality of electrodes adapted to be in electrical contact with the following fluid and so arranged that in operation an induced potential will exist between the electrodes located in each half of the electromagnet when the fluid flows through the tube and a current is passed through the windings.

6 Claims, 2 Drawing Figures

PATENTED AUG 8 1972  3,681,986

FLUID FLOW METERS

This is a continuation of application, Ser. No. 822,204, filed May 6, 1969.

This invention relates to fluid flow meters and more particularly to a flow meter of the type in which fluid flow is measured indirectly by allowing the fluid to flow in a magnetic field using e.m.f. induced in the fluid as a measure of fluid flow.

In existing fluid flow meters of this type, the magnetic field has been generated by an electromagnet in which the windings are on a conventional iron U-core or which has no core or in which the windings are concentrated in one region of an iron core and which are not distributed uniformly over it. Such meters are not equally sensitive to laminar and turbulent fluid flow. It has now been found that this problem can be alleviated particularly in tubular blood flow meters, by modifying the magnetic field pattern.

The present invention provides a flow meter for measuring the flow rate of an electrically conductive fluid, particularly blood, which comprises a tube, an electromagnet consisting of a ferro-magnetic core material in the form of a thin-walled collar encircling or substantially encircling the tube and windings on the core, the windings being wound transversely around the core in a uniform manner but being oppositely directed on diametrically opposed halves of the core, and a plurality of electrodes adapted to be in electrical contact with the flowing fluid and so arranged that in operation an induced potential will exist between the electrodes located in each half of the electromagnet when the fluid flows through the tube and a current is passed through the windings.

The flow meter is preferably of cylindrical form with an axially directed slot communicating the interior and the exterior of the meter so that an intact artery or vein can be inserted directly. Alternatively, the cylinder may be intact and provided with ends suitable for the attachment of divided arteries, veins or other tubing.

The electromagnet core has preferably a high magnetic permeability and laminated Permalloy C is particularly suitable.

The direction of the windings around the metal core is reversed half way round, conveniently at the point diametrically opposite to the opening of slotted meters, and when the windings are excited by an A.C. current a substantially North/South magnetic field is obtained.

It has been found that the regions inside the meter most affected by flow rate and by magnetic field strength are those regions at the ends of a diameter drawn perpendicular to the general direction of the magnetic field and the electrodes are preferably located in this region. Two electrodes may be used, one at each end of the above-mentioned diameter, but more than two can be used in which case the center of each electrode system should be located at or near the ends of the above-mentioned diameters.

The magnetic intensity is higher in the region of the electrodes relative to that at the axis of the meter and benefit can be obtained to the uniformity of sensitivity of the meter with changing flow profile by reducing the magnetic intensity in the region of the electrodes. This reduction is preferably achieved by providing strips of a ferro-magnetic material, such as Permalloy B, located between the electrode and the magnetic system.

The size of the strips influences the degree of reduction of magnetic intensity and some experimentation is necessary to determine the optimum size for a particular application. Magnetic intensity may also be reduced by creating a gap in the windings in the region of the electrical center of the electrode systems or providing at such points suitable ancillary windings.

The electrodes may be of a noble metal, particularly platinum, having a bright surface or a surface of deposited colloidal noble metal. These electrodes may be located in electrical connection with the wall of the vessel through which the fluid flows and are preferably recessed, inside this wall in suitable cases.

A suitable embodiment of this invention will now be described, with reference to the accompanying drawing, in which.

Figure 1:
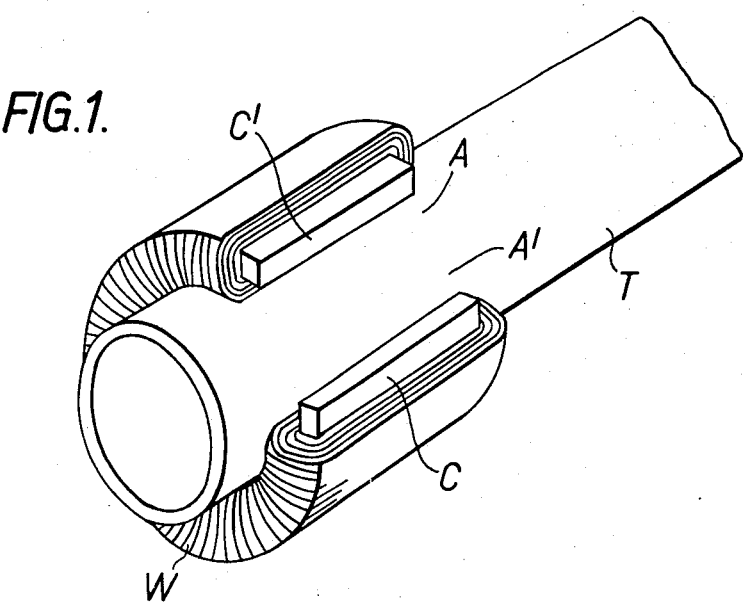
FIG. 1 shows a perspective view of a slotted cylindrical blood meter.
Figure 2:
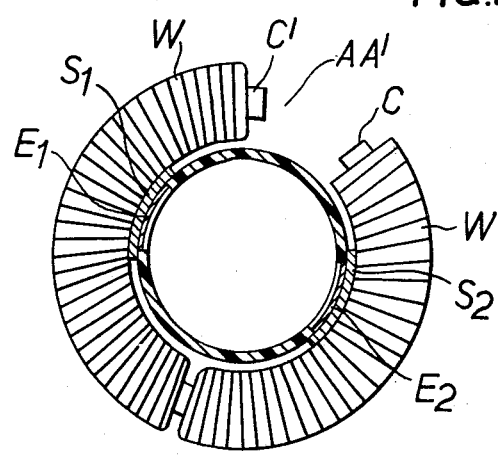
FIG. 2 shows an end elevation.

The instrument comprises a hollow tube or cannula T through which blood is permitted to flow or within which an intact artery or vein may be placed by passing the vessel through slot AA'. The cannula is fitted with electrodes $E_1$, $E_2$ which are of platinised gold, which are, for better base line stability, placed on the bottom of shallow slots circumferentially directed and subtending an angle of about 20° at the axis of the cannula. The latter arrangement has the further advantage of low noise level. The magnetic field is provided by an energized magnetic circuit, consisting of a laminated core of Permalloy C (CC') around which is wound a number of turns of wire W which carry the exciting current. The turns are wound in opposing directions on each half of the core, thus producing a magnetic flux, the general direction of which is North/South. The distribution of magnetic flux within the cannula is such that the magnetic intensity at the electrodes $E_1$, $E_2$ is greater than that at the axis whereas the magnetic intensity in the region of the slot AA' is less than that at the axis, that at the closed side P is greater than that at the axis. The net effect of this magnetic field distribution is to cause increased sensitivity to flow when the latter is turbulent as compared with that when the flow is lamina. This difference may be reduced to a fraction of 1 percent by reducing the magnetic intensity at the electrodes by placing on the outside of the cannula but within the magnetic circuit narrow strips $S_1$, $S_2$ of Permalloy B selectively positioned over the electrodes with their length parallel to the axis of the cannula. The effect of different strip widths upon the induced voltage between electrodes 10 mm. apart with different types of flow is examined and it is found that the strip width of 3.3 mm. gives nearly the same sensitivity for both laminar and turbulent flows and for intermediate regimes while axis symmetry of flow profile is maintained.

The device described above is designed as a blood flow meter but the principle of operation is equally applicable to the measurement of flow rate of other electrically conducting fluids.

The magnetic circuit described above has the following advantages:

1. Volume within its cylindrical walls is largely filled with iron and copper and, therefore, is largely usefully employed from an electromagnetic viewpoint. Further-more, the area of the windings coincides with the inner and outer areas of the cylinder, leading to efficient heat dissipation and minimal temperature rise of the windings. As a result, the flow meter head can be made with a smaller wall thickness, lower temperature rise and higher sensitivity than the conventional "Air-cored" head. They also compare favorably with the conventional U-shaped iron core heads partly because the leakage flux, and therefore the necessary cross-section, is less.

2. The heads can be designed over a large range of sizes from 3 mm. lumen diameter upwards and the design formulas can be programmed and the characteristics computed in detail.

3. The magnetic circuit is readily screened in its entirety, thus eliminating spurious signals, this can be done by wrapping circumferentially within and without the magnetic circuit, a strip of high resistivity alloy of small thickness, e.g. 0.0004 inch 45 percent nickel copper.

4. The electrode leads are led, when they are not twisted together, within the magnetic circuit which produces a useful degree of screening from external magnetic fields, e.g. the leakage flux from adjacent electromagnetic flow meter heads, and interaction between heads is reduced.

I claim:

1. In a flowmeter for measuring the flow rate of blood through a tube, said meter comprising a core of ferro-magnetic material in the form of a thin-walled collar encircling or substantially encircling said tube, electrical windings wound transversely about said core in a uniform manner but being oppositely directed on diametrically opposed halves of the core to produce a nonuniform magnetic field within said tube, and a plurality of electrodes adapted for electrical contact with the flowing fluid and so arranged that, in operation, an induced potential will exist between the electrodes when fluid flows through said tube and a current is passed through said windings, the improvement comprising:

shielding strips of ferro-magnetic material disposed substantially adjacent and between said electrodes and the magnetic system comprising said core and said windings for modifying the magnetic intensity in the region of the electrodes by concentrating the available magnetic intensity in said strips thereby making the magnetic field distribution in said tube even less uniform by substantially reducing the magnetic field intensity in the immediate vicinity of said electrodes within said fluid and thereby reducing the susceptibility of said flowmeter to changes in sensitivity caused by a changing axisymmetric flow profile of the fluid.

2. An improved blood flowmeter as in claim 1 wherein the electrodes are located inside the magnetic system in regions at the ends of a diameter drawn perpendicular to the direction of the magnetic field.

3. An improved blood flowmeter as in claim 1 wherein the flowmeter is of the cuff type having a generally cylindrical form with an axially directed slot communicating between the interior and exterior of the meter for insertion of a blood vessel.

4. An improved blood flowmeter as in claim 3 wherein the direction of the windings about the core are reversed at a point diametrically opposite to the opening of the slot.

5. An improved blood flowmeter as in claim 1 wherein said ferro-magnetic material comprises laminated Permalloy C.

6. An improved blood flowmeter as in claim 1 wherein the flowmeter is of the cannular type having a central tube for fluid connection with a divided blood vessel.

* * * * *